(12) United States Patent
Truitner (10) Patent No.: US 8,949,905 B1
(45) Date of Patent: Feb. 3, 2015

(54) BOOKMARKING, CATALOGING AND PURCHASING SYSTEM FOR USE IN CONJUNCTION WITH STREAMING AND NON-STREAMING MEDIA ON MULTIMEDIA DEVICES

(75) Inventor: Ian Truitner, Sun Valley, CA (US)

(73) Assignee: Randian LLC, Sun Valley, CA (US)

( * ) Notice: Subject to any disclaimer, the term of this patent is extended or adjusted under 35 U.S.C. 154(b) by 0 days.

(21) Appl. No.: 13/537,489

(22) Filed: Jun. 29, 2012

Related U.S. Application Data (60) Provisional application No. 61/571,880, filed on Jul. 5, 2011.

(51) Int. Cl.
*H04N 5/445* (2011.01)

(52) U.S. Cl.
USPC .............................. 725/60; 725/41; 709/219

(58) Field of Classification Search
USPC ................. 725/37–61, 87–118, 131–134, 725/139–142; 709/217–232
See application file for complete search history.

(56) References Cited

U.S. PATENT DOCUMENTS

| | | | |
|---|---|---|---|
| 6,496,857 B1 * | 12/2002 | Dustin et al. ................ | 709/219 |
| 6,615,408 B1 | 9/2003 | Kaiser et al. | |
| 6,658,663 B1 * | 12/2003 | Bruynsteen ................ | 725/134 |
| 6,765,557 B1 | 7/2004 | Segal et al. | |
| 7,076,792 B2 | 7/2006 | Zigmond et al. | |
| 7,139,970 B2 | 11/2006 | Michaud et al. | |
| 7,249,367 B2 | 7/2007 | Bove, Jr. et al. | |
| 7,493,636 B2 * | 2/2009 | Kitsukawa et al. ............. | 725/23 |
| 7,644,414 B2 * | 1/2010 | Smith et al. .................... | 719/328 |
| 7,827,577 B2 | 11/2010 | Pack et al. | |
| 7,849,226 B2 | 12/2010 | Zigmond et al. | |
| 7,933,290 B2 * | 4/2011 | Aholainen .................... | 370/466 |
| 8,230,098 B2 * | 7/2012 | Chen et al. .................... | 709/231 |
| 8,413,188 B2 * | 4/2013 | Walter .......................... | 725/40 |
| 8,499,059 B2 * | 7/2013 | Stoyanov ...................... | 709/220 |
| 8,732,337 B2 * | 5/2014 | Julia et al. .................... | 709/249 |
| 8,806,520 B2 * | 8/2014 | Sharif-Ahmadi et al. ..... | 725/14 |
| 2002/0083469 A1 * | 6/2002 | Jeannin et al. ................ | 725/135 |
| 2003/0005463 A1 | 1/2003 | Macrae et al. | |
| 2006/0089843 A1 | 4/2006 | Flather | |
| 2007/0005795 A1 | 1/2007 | Gonzalez | |

FOREIGN PATENT DOCUMENTS

WO  WO 2009/024990  2/2009

* cited by examiner

*Primary Examiner* — Annan Shang
(74) *Attorney, Agent, or Firm* — Thomas I. Rozsa (57) ABSTRACT

A system and process by which a product and the data associated with the product, including standard product information, information associated with the context of the product, external information, as well as live updates and feeds, are accessible to a purchaser during and after the viewing of streaming and non-streaming media on a multi-media device. The system includes a means of purchasing products online on a multimedia device, both during and after a streaming video, that is low cost and easy to use and access. It provides the ability to create and build an interactive catalog and bookmarking system and provides interactive use among the video, the retailers, and buyers, and also the ability for live, automatic, online updates of product, sales and user information and comments.

10 Claims, 6 Drawing Sheets

BOOKMARKING, CATALOGING AND PURCHASING SYSTEM FOR USE IN CONJUNCTION WITH STREAMING AND NON-STREAMING MEDIA ON MULTIMEDIA DEVICES

This patent application claims priority to Patent Application Ser. No. 61/571,880 filed on Jul. 5, 2011.

BACKGROUND OF THE INVENTION

1. Field of the Invention

The present invention relates generally to devices that facilitate online purchases on a digital or multimedia device. The invention herein relates more specifically to devices and systems which facilitate the purchase of an article seen by the purchaser on a running video on a digital multimedia device.

2. Description of the Prior Art

The following twelve patents are relevant to the field of the present invention:

1. United States Published Patent Application No. 2003/0005463 to Douglas B. Macrae et al. on Jan. 2, 2003 for "Access To Internet Data Through A Television System" (hereafter the "Macrae Published Patent Application");

2. U.S. Pat. No. 6,615,408 issued to David H. Kaiser et al. on Sep. 2, 2003 for "Method, System, And Apparatus For Providing Action Selections To An Image Referencing A Product In A Video Production" (hereafter the "Kaiser Patent");

3. U.S. Pat. No. 6,765,557 issued to Jack A. Segal et al. on Jul. 20, 2004 for "Remote Control Having Touch Pad To Screen Mapping" (hereafter the "Segal Patent");

4. United States Published Patent Application No. 2006/0089843 to David Flather on Apr. 27, 2006 for "Programmable, Interactive Task Oriented Hotspot, Image Map, or Layer Hyperlinks Within a Multimedia Program and Interactive Product, Purchase or Information Page Within a Media Player, with Capabilities to Purchase Products Right out of Media Programs And/or Media Players" (hereafter the "Flather Published Patent Application");

5. U.S. Pat. No. 7,076,792 issued to Daniel J. Zigmond et al. on Jul. 11, 2006 for "Document Data Structure And Method For Integrating Broadcast Television With Web Pages" (hereafter the "'792 Zigmond Patent");

6. U.S. Pat. No. 7,139,970 issued to Jeffrey H. Michaud et al. on Nov. 21, 2006 for "Assigning A Hot Spot In An Electronic Network" (hereafter the "Michaud Patent");

7. United States Published Patent Application No. 2007/0005795 to Ruben Gonzalez on Jan. 4, 2007 for "Object Oriented Video System" (hereafter the "Gonzalez Published Patent Application");

8. U.S. Pat. No. 7,249,367 issued to V. Michael Bove, Jr. et al. on Jul. 24, 2007 for "Method and Apparatus For Switching Between Multiple Programs By Interacting With A Hyperlinked Television Broadcast" (hereafter the "Bove Patent");

9. U.S. Pat. No. 7,827,577 issued to Bok Hyun Pack et al. on Nov. 2, 2010 for "Apparatus and Method For Providing And Obtaining Product Information Through A Broadcast Signal" (hereafter the "Pack Patent");

10. U.S. Pat. No. 7,849,226 issued to Daniel J. Zigmond et al. on Dec. 7, 2010 for "Television with Set Top Internet Terminal with User Interface Wherein Auxiliary Content Is Received That Is Associated with Current Television Programming" (hereafter the "'226 Zigmond Patent");

11. PCT Application No. WO 01/37109 issued to Ivan Hwang on May 25, 2001 for "System and Method for Implementing On-Site Electronic Purchasing Using User-Operated Terminals" (hereafter the "Hwang PCT Application");

12. PCT Application No. WO 2009/024990 issued to Yogsesh Rathod on Feb. 26, 2009 for "System of Processing Portions of Video Stream Data" (hereafter the "Rathod PCT Application").

The Macrae Published Patent Application discloses a device that requires a television signal over which a website is encoded and the concept of having a URL on a television screen and requiring a television signal as well as a video processor.

Specifically, the patent discloses:

"An interactive television system in which a URL representing an Internet web site is encoded in a television signal. The user may link to the web site by selecting an icon (95) displayed on the television screen."

Paragraph 22 states:

"Internet data, including Internet site addresses, is stored in Internet data memory 36. Internet data memory 36 is connected to a microprocessor 24 that is programmed to control the operation of the described equipment (Internet data memory 36 could be part of the RAM of microprocessor 24). An operating program for microprocessor 24 is stored in a read only memory (ROM) 26. A viewer input device 28, preferably in the form of a remote IR controller, is coupled to microprocessor 24 to provide commands from the viewer. A video processor 30 is coupled to microprocessor 24. When the viewer wishes to see Internet site addresses, microprocessor 24 recalls a portion of the Internet data from memory 36 and couples it to video processor 30, where the Internet site addresses are formatted for display. Preferably, the information stored in video processor 30 is a bit map of what is displayed on the screen of television receiver 20. Video processor 30 is connected to the other input of PIP chip 19. Preferably, viewer input device 28 controls microprocessor 24 by cursor movement on the screen of television receiver 20. To this end, microprocessor 24 and video processor 30 are coupled to a cursor position register 32. (Alternatively, the viewer can select items of information displayed on the screen by keying into viewer input device 28 code numbers assigned to these items.) Microprocessor 24 is also coupled to tuner 11 for channel change, to VCR 17 for play/record selection and start/stop, to switch 18 for selection of one of its inputs, and to PIP chip 19 for selection of the mode of PIP operation."

The Kaiser Patent discloses:

"Disclosed are a method, apparatus and system for providing action selections to an image referencing a product in a video production. According to the disclosure a method for providing action selections to an image referencing a product in a video production, said method includes (1) communicating a video production to a reproducing apparatus, said video production comprising a placement zone and a trigger zone at least partially coincident with said placement zone, wherein said trigger zone comprises a trigger resource identifier, and wherein said placement zone comprises an image referencing a product; (2) communicating to said reproducing apparatus an indication that an action selection interface associated with said product is available in response to a request corresponding to said trigger; and (3) communicating to said reproducing apparatus a characterization of said action selection interface, wherein said action selection interface comprises a selectable action. An apparatus according to the invention may include a server programmed to interact and provide action resources to. A system according to the disclosure may include the facility communicating the video production to the reproducing apparatus which sends a request to the server which provides action resources."

The Kaiser Patent discloses the broad concept of having being able to purchase or request further information from the touchscreen. The device as disclosed in this patent is for use in conjunction with touchscreen systems wherein an individual can touch a screen and request more information about the product or even purchase the product. On Column 7, beginning on Line 30 and continuing to Line 56, the patent states:

"The video production 1100 operates with the reproducing apparatus 1300 which described in greater detail below with reference to FIG. 3. As noted above, the reproducing apparatus 1300 provides, at least, the functions of receiving and reproducing the video production and of a client in client-server communications. One of skill in the art will recognize numerous structures of programmed or programmable logic also capable of performing these and other functions in accordance with aspects of the invention. Exemplary structures could include, for example, a programmed general purpose computer with suitable video hardware, an integrated receiver/client appliance such as a set-top box, and special purpose computing machinery comprising an application specific integrated circuit (ASIC). Structures currently commercially available which provide at least the above-identified functions include, for example, a WEBTV Plus set-top box available from WebTV Networks, Inc. of Palo Alto, Calif., U.S.A. It is contemplated, however, that the present invention will operate with other structures able to perform the above-identified functions (now known or later-developed). The remote control used with the WEBTV Plus set-top box is one example of a suitable form for the selection device 1700. Many others will be recognized by those of skill in the art including, for example, pointing devices used with personal computers, other selection systems such as those based on speech recognition, and touch-screen systems."

The Segal Patent discloses a remote control having a touch pad to screen mapping. This patent discloses the broad concept of having a remote control device being able to map onto the display screen of a home entertainment device including interactive television. Specifically, the patent discloses:

"A remote control for controlling a home entertainment (HE) device such as an Interactive television having a display screen. The remote control includes a touch pad mapped to the display screen of the HE device as a function of the ratio of the areas of the touch pad and the display screen such that each location of the touch pad corresponds to a respective location of the display screen. The remote controller further includes a controller operable with the touch pad to enable a control function associated with a location of the display screen in response to the corresponding location of the touch pad being touched for controlling the HE device. The display screen may include on-screen keyboards, control panels and menus, an Internet page, an electronic program guide, and the like."

The Flather Published Patent Application discloses as follows:

"Described is a system and method whereby special layers, hot spots or image maps can be programmed in to media displayed through common Internet enabled media players so that users or viewers of the media can interact in a minimally obtrusive fashion with the media being shown to perform a host of tasks or actions. Such tasks or duties can take the form of but are not limited to initiating a purchase transaction, requesting more information to be sent via electronic mail and so on. In addition, special, Internet enabled (or static, non Internet/hyper linked pages) feature pages can be programmed to appear at preset time codes at any point within a media program. The purpose of such pages can be diverse including but not limited to the role of advertising or offering products for sale relating or not relating to the media program, promoting related or unrelated media programs or acting as a bridging point connecting together a series of media programs, much like an index of a book points to the chapters of the book. Such multimedia programs can be displayed on devices including but not limited to computer screens, personal organizers with wireless Internet connections or even a television screen. Users viewing media can interact with the program in viewing environments including but not limited to: Internet type connections, telecommunication (telephone, ISDN, ADSL), VSAT satellite, and other wire and wireless transmission including as well as video conferencing. The goal of the interaction is to provide a useful and minimally interruptive form of advertising, enacting the sale of a product or service or communicating information in a synchronized manner that may or may not relate to the media being played. The interaction can take the form but is not limited to sending a follow up email containing a special offer or information, or the interaction can even prompt the person(s) to initiate a purchase process for a good or service being promoted in conjunction with the media program. In other embodiments, viewers may interact with a given program by means of a plurality of options that include but are not limited to selecting an icon or banner or pressing a button on a remote control. The resulting action sequence will then be initiated, be it a request for information, a purchase activity and so on."

The '792 Zigmod Patent discloses a document data structure and method for integrating broadcast television with web pages. This invention discloses a method and apparatus for incorporating television broadcasts into web pages so that you can watch a television broadcast over your computer. Specifically, the abstract states:

"Described are a method and apparatus for incorporating broadcast television into Web pages. Broadcast television can be embedded into Web pages using, for example, a "tv:" attribute in conjunction with common HTML tags. Within the "tv:" attribute, a Web-page author can reference a TV station by channel number, network, or broadcast call letters. HTML documents are parsed to recover both the conventional tags and tags that include TV attributes. The resulting Web pages display the identified broadcast TV in a frame specified by the TV attribute. One embodiment supports the presentation of television in the background of an HTML document. In that embodiment, HTML tags corresponding to overlying HTML content are provided with an attribute that defines a level of transparency from zero to one-hundred percent. The transparency attribute allows content providers to overlay any type of HTML information over a broadcast television show without completely obscuring the underlying show. This aspect of the invention employs a z attribute that can be used to specify the relative position of broadcast television and overlying HTML content."

The Michaud Patent discloses:

"Apparatus and methods implementing a technique for creating an electronic artwork with a hot area. For a selected layer of the artwork, a non-transparent region is identified and an action is assigned to an area corresponding to the non-transparent region, the action defining a function that will be activated when the area is selected. The technique is advantageous in computer application programs that composite images from layers and for producing HTML (HyperText Markup Language) output that refers to a corresponding composited image, where the action is a URL and the area is defined by an image map."

Further the patent states:

"In general, in one aspect, the invention features apparatus and methods implementing a technique for creating an electronic artwork with a hot area. For a selected layer of the artwork, a non-transparent region is identified and an action is assigned to an area corresponding to the non-transparent region, the action defining a function that will be activated when the area is selected. The technique is advantageous in computer application programs that composite images from layers.

Advantageous implementations of the technique include one or more of the following features. The action is a URL (Uniform Resource Locator). The layers of the artwork are composited and the area and the action are converted to a target output format. The target output format is HTML (HyperText Markup Language). A boundary of the non-transparent region is calculated and a definition of the area is calculated from the boundary. The composited artwork is written out as an image file and an HTML file is written out; the HTML file contains an image map for the area and a URL for the action, and refers to the image file.

Among the advantages of the invention are one or more of the following. An image object associated with a hot spot can be edited, and the hot spot will be conformed automatically to the edited object. The content of a layer defining a hot spot can be dynamic, that is, computed from other data at the time the layers are composited, and the hot spot will be conformed automatically to the dynamic content. Multiple hot spots can easily be created in a composite artwork. The method of assigning hot spots can be added easily to any graphics application that supports layers. The regions in the artwork layer by which a hot spot is defined do not have to be visible in the final composited image. For example, a visibility attribute of a hot spot layer can be set to invisible, and the hot spot will still be generated."

The Gonzalez Published Patent Application states:

"A method of generating an object oriented interactive multimedia file, including encoding data comprising at least one of video, text, audio, music and/or graphics elements as a video packet stream, text packet stream, audio packet stream, music packet stream and/or graphics packet stream respectively, combining the packet streams into a single self-contained object, said object containing its own control information, placing a plurality of the objects in a data stream, and grouping one or more of the data streams in a single contiguous self-contained scene, the scene including format definition as the initial packet in a sequence of packets. An encoder for executing the method is provided together with a player or decoder for parsing and decoding the file, which can be wirelessly streamed to a portable computer device, such as a mobile phone or a PDA. The object controls provide rendering and interactive controls for objects allowing users to control dynamic media composition, such as dictating the shape and content of interleaved video objects, and control the objects received."

The Bove Patent discloses a method and apparatus for switching between multiple programs by interacting with a hyperlinked television broadcast. Specifically, the patent discloses:

"A system and method of adding hyperlinked information to a television broadcast. The broadcast material is analyzed and one or more regions within a frame are identified. Additional information can be associated with a region, and can be transmitted in encoded form, using timing information to identify the frame with which the information is associated. The system comprising a video source and an encoder that produces a transport stream in communication with the video source, an annotation source, a data packet stream generator that produces encoded annotation data packets in communication with the annotation source and the encoder, and a multiplexer system in communication with the encoder and the data packet stream generator. The encoder provides timestamp information to the data packet stream generator and the data packet stream generator synchronizes annotation data from the annotation source with a video signal from the video source in response to the timestamp information. The multiplexer generates a digital broadcast signal that includes an augmented transport stream from the transport stream and the encoded data packets. A receiver displays the annotation information associated with the video signal in response to a viewer request on a frame by frame basis. A viewer can respond interactively to the material, including performing commercial transactions, by using a backchannel that is provided for interactive communication."

This patent discloses the hyperlinked information attached to frames of a television broadcast.

The Pack Patent discloses:

"The present invention relates to an apparatus and method for providing and obtaining product information through a broadcast signal. In this present invention, information identifying a product item, which is in a scene to be presented from a broadcast signal, is provided together with a broadcast signal, then a signal receiving terminal stores the product information for a new product item and displays the stored information to a viewer to select one product item while or after watching an interesting broadcast program, and transmits data identifying a selected product item to a predetermined web site and receives web site address for the selected item from that site. As a result, derailed information for the selected item is acquired from a server addressed by the received web site address."

In particular, the patent discloses:

"It is another object of the present invention to provide a product information delivering method and apparatus enabling a viewer to obtain shopping information independently when products are displayed in a scene.

It is another object of the present invention to provide a product information delivering method and apparatus enabling a viewer to obtain shopping information rapidly when products are displayed in a scene.

It is another object of the present invention to provide a product information delivering method and apparatus enabling a viewer to obtain shopping information more quickly when products are displayed in a scene and also allow simultaneous watching of a broadcast program while the information is displayed.

It is another object of the present invention to provide a product information delivering method and apparatus enabling a viewer to obtain shopping information for products displayed in a scene when a program is over without interruption of the program watching.

It is another object of the present invention to provide a product information delivery method and apparatus enabling a viewer to obtain shopping information for a desirable product which was displayed in program presentation without causing an interruption in the viewing of a television program.

In a preferred embodiment of the present invention, broadcast programs are provided together with product information including address information of a site to access derailed shopping information for desirable products which are displayed in the broadcast program presentation.

In another preferred embodiment of the present invention, broadcast programs are provided for a presentation terminal such as a television set ("TV") or a personal computer ("PC") together with product information, then a presentation terminal compares received product information with previous product information, stores the received product information if it is confirmed that the received product information is new based on the comparison, and displays the stored product information onto a screen or a monitor upon a viewers request."

The '226 Zigmond Patent discloses a television with set top internet terminal with user interface wherein auxiliary content is received that is associated with current television programming. Specifically, the patent states:

"A viewer of television programming is alerted to the availability of content related to the programming (e.g. an associated Internet web page) by an icon momentarily displayed on the screen. Using a remote control, the viewer can select the icon. A control panel then appears, superimposed over the television image, and provides additional detail about the related content. By further operating the remote control, the viewer can select the associated content for viewing, or return to watching the television. Various other features and variations are disclosed."

This patent discloses a device which will pause the television screen and allow you to either go to the web page to purchase the product or to continue watching the television program.

The patent further discloses:

"Various embodiments of the present invention will be described with reference to logical addresses that are embedded within a broadcast television signal. The logical addresses may provide "links" to Internet, Web, or other local or remote content related or unrelated to a program being broadcast. A form of logical address (also referred to as a resource locator) commonly associated with Web content is a Uniform Resource Locator ("URL"). A URL is a compact string representation of a location used to identify an abstract or physical resource on the Internet. Of course, alternative means of uniquely identifying content may be employed. For example, it is appreciated that keys (e.g., database indices), network addresses (e.g., IP addresses), and other identification mechanisms, alone or in combination, may be employed to uniquely identify a resource. Therefore, while the term URL refers to a specific type of content identifier used in connection with the Web, the terms logical address and/or resource locator are used herein to refer to content/resource identification mechanisms generally.

Links to Internet/Web content provide an easy and powerful way to bring the richness and interactive nature of the Internet to TV. Such links may be used by program producers, program sponsors, networks, local affiliates, and other content providers to link TV viewers to web content specifically designed to complement what the viewers are watching on TV. Various embodiments of the present invention provide and transmit logical addresses that identify content (e.g., Internet content) within a video signal. For example, content providers can transmit URLs to viewers by inserting URL data, in a predetermined syntax, within line 21 of the vertical blanking interval of an analog television signal. Other known data embedding techniques can also be used.

According to one aspect of the present invention, on receipt of a logical address in a TV signal, an icon or some other visual indication is presented to the viewer to notify the viewer of the availability of Internet content. The viewer can then select the visual indication to view the content concurrently with the TV broadcast or save the logical address for later viewing.

Logical addresses embedded in video may refer to content stored on a CD-ROM or other mass storage device, an Intranet server, or other resource. Additionally, certain aspects of the invention described herein are equally applicable to other TV viewing devices, such as personal computers equipped with TV tuners, and the like. Moreover, while various embodiments of the present invention will be described with reference to an NTSC broadcast video signal, other broadcast TV systems are equivalent for the purpose of the present invention, such as Phase Alternate Lines (PAL), Sequential Couleur Avec Memoire (SECAM), and the proposed High Definition Television (HDTV) standard. Finally, it is appreciated that a variety of other transport mechanisms can be employed, including digital satellite, digital TV, and cable TV."

The Hwang PCT Application was published on May 25, 2001 and discloses a system and method for implementing on-site electronic purchasing using user-operated terminals. Specifically, the patent application discloses:

"A system that provides interactive multimedia based electronic purchasing services to a group of concurrent customers in a commercial site via user operated wired and wireless transaction terminals, i.e., commercial Personal Digital Assistants (PDAs). The disclosed system is comprised of a multiple-computer-based server array and a number of multi-link commercial PDAs. The invention further employs a number of unique methods for implementing interactive advertising-based, interactive payment-based, as well as customized content-based electronic purchasing services. Moreover, the invention can accommodate a plurality of concurrent customers ranging from a few to thousands, using multi-link-based workgroup server arrays that can deliver mission-critical highly-available and scaleable on-demand interactive multimedia-based electronic purchasing services in a commercial site."

This patent application discloses a device by which purchasers can wirelessly pay for their transactions either physically on-site at the point of sale or by paying through e-commerce.

The Rathod PCT Application discloses a system of processing portions of video stream data. Specifically, the patent discloses:

"The present invention relates to system and method of processing including searching, matching, automatic identification, selection and actions on one or more image portion(s) of image frame(s) of digitized video data and video stream data for the purpose of enabling object handling including searching, matching, automatic identification, selection(s), associate action(s), remote action(s) and two or multi way communication and collaboration; and based on that exemplary Universal Live Commerce services, platform and networks which provides advance visual and live interactive e-commerce including (marketing, bids, auctions and e-tailing), visual and live search & match making, visual and live advertising and showcasing, visual and live security system, visual and live learning and training system, visual and live presentation system, visual automation, visual and live entertainment & games, visual and live information access, extended visual and live communication utility, visual and live data entry and processing facilates silent or direct or zero stock commerce."

Marketing, promotion and sales on multimedia devices has become a subject of increased interest and importance as multimedia devices become ubiquitous and the public becomes more adept and accustomed to using such devices. The potential of these devices is far reaching, and business is eager to explore ways to capitalize on the technology. To this end, a variety of methods have been explored and developed as possible ways to turn the technology into a viable marketplace. The most common ones described are based on traditional models of presenting merchandise in a static, and singular and/or limited contextual image and text for purchasers utilizing an on-line purchasing means.

None of the aforementioned prior art describes an on-line purchasing system which is more efficient than those disclosed.

SUMMARY OF THE INVENTION

The present invention is a means of purchasing products online on a multimedia device, both during and after a streaming video, that is low cost and easy to use and access. It provides the ability to create and build an interactive catalog and bookmarking system and provides interactive use among the video, the retailers, and buyers, and also the ability for live, automatic, online updates of product, sales and user information and comments. It has the capability of showing the product outside of the video stream and with the information associated with the video wherein the product was featured and the capability of being connected to other media content and social networks.

It is an object of the present invention to provide a purchasing system on a multimedia device that is a means of purchasing products online on a multimedia device, both during and after a streaming or non-streaming video. It is low cost and easy to use and access. The present invention creates and builds an interactive catalog and book marking system. It has interactive use among the video, the retailers, and buyers, and also provides for live, automatic, online updates of product, sales and user information and comments. It can show the product outside of the video stream and with the infoiniation associated with the video wherein the product was featured. The present invention connects the product to other media content and social networks. The present invention further saves the on-line data to be accessed when the multi-media device is off-line.

While the present invention uses static images, the approach here is new and very different from what has been proposed in the past. The concept of the present invention is based on presenting merchandise in both a moving and non-moving format on a digital on-line device wherein additional information and content becomes associated with the merchandise and presented to the purchaser.

The aforementioned objects and advantages, as well as additional novel features and other objects of the present invention will become apparent from the following drawings, detailed description and discussion.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention.

Figure 1:
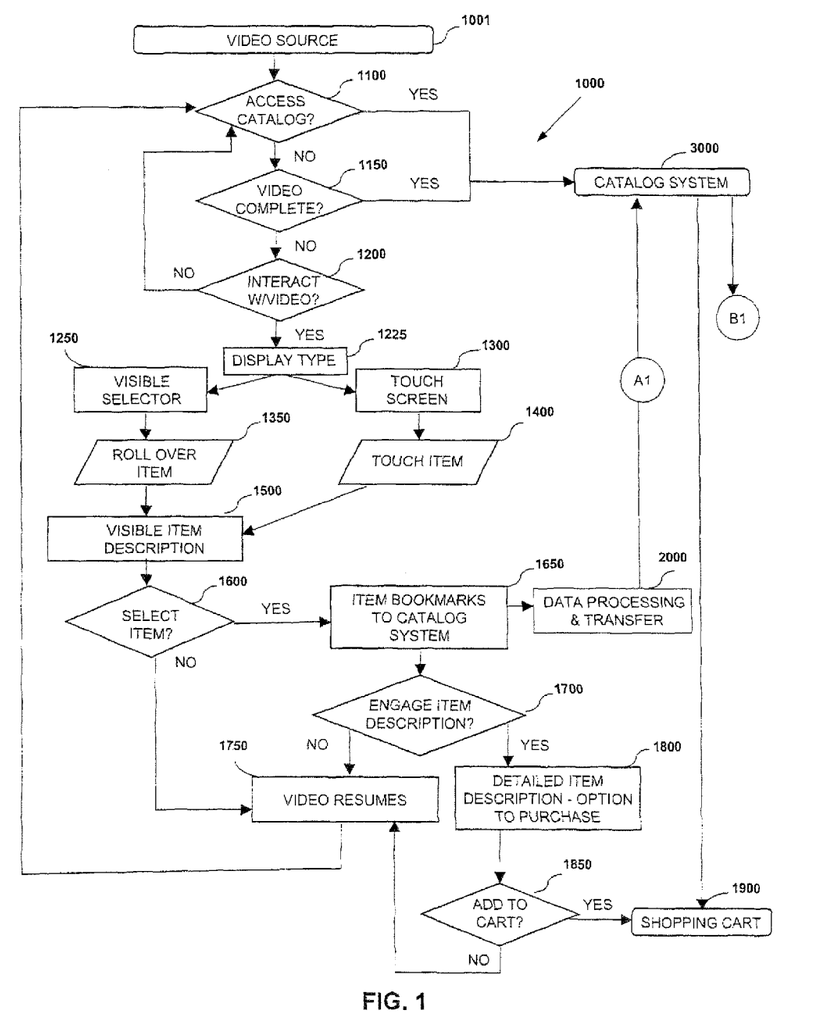
FIG. 1 is a block diagram illustrating the general system of a preferred embodiment of the present invention.

Referring to the accompanying figures, it will be seen that the BOOKMARKING, CATALOGING AND PURCHASING SYSTEM 1000, (hereafter "BC&P SYSTEM") as seen from the point of view of a purchaser, can begin with the purchaser viewing a VIDEO SOURCE 1001, which is displayed through the internet, cable, wireless, digital or broadcast signal on a device, such as a computer, telephone, internet connected television, mobile device, digital device or any other multimedia device. VIDEO SOURCE 1001 may even be a projected video. The VIDEO SOURCE 1001 can be a movie, an infomercial, a television show, music video, commercial, live event and the like. The VIDEO SOURCE 1001 will naturally contain objects, persons, clothing, locations, and combiniations thereof. The present invention will allow the viewing purchaser to take a closer look at these things and purchase them. It can be seen that the present invention is particularly useful to those who wish to promote and/or increase sales and popularity of that which they are promoting. It can be seen that the present invention is particularly advantageous for advertisers who have product placement in movies, television shows and live events, in that the present invention allows the viewing purchaser to purchase the item when it appears or after, or tells the viewing purchaser the closest store that sells the item. The present invention can be used to allow a viewing purchaser the ability to book a room at the hotel that is being used on the screen, or purchase the dress worn by an actress, or the equipment being used by an athlete. It can be seen that the innovation of the present invention surpasses that of the prior art and has far reaching, and very useful capabilities. The VIDEO SOURCE 1001 signal has a transparent layer over the VIDEO SOURCE 1001 allowing the user to identify and engage with objects that appear on the screen. At any time, the purchaser may access the CATALOG SYSTEM 3000, through a link ACCESS CATALOG 1100. If the purchaser does not access the link to the CATALOG SYSTEM 3000 during the run of the VIDEO SOURCE 1001, the VIDEO SOURCE 1001 will play until completion. When the VIDEO COMPLETE 1150 has been reached, the CATALOG SYSTEM 3000 (see FIG. 3) will automatically engage. If the VIDEO COMPLETE 1150 responds that it is not complete, then INTERACT WITH VIDEO 1200 prompts the viewer/purchaser. If the response is no, the INTERACT WITH VIDEO 1200 returns to ACCESS CATALOG 1100 and the process repeats. If the response is yes, then INTERACT WITH VIDEO 1200 goes to the next step, DISPLAY TYPE 1225, to detect by what means the viewer/purchaser will be interacting with the VIDEO SOURCE 1001 and the multimedia device.

While the VIDEO SOURCE 1001 is being viewed or playing, objects that appear on the screen will have an interactive layer allowing the viewer to engage with the objects. Currently, there are two ways to acknowledge and process that the viewing purchaser may interact with these objects. The first is by means of an external device, such as a mouse, joystick, controller, touchpad, motion sensor, and keyboard, that allows the user to move a cursor on the screen and/or to identify links, objects, and other interactive items. For purposes of this specification, the general, exemplary term "mouse" shall refer to any and all external devices. The second is by means of a touchscreen that allows viewers to interact with links, objects and other interactive items by touching the screen and without the use of an external device. It is within the spirit and scope of this invention to include other means of accessing and interacting with digital devices. The BC&P SYSTEM 1000 detects the type of display at DISPLAY TYPE 1225, at which point the BC&P SYSTEM 1000 will enact the appropriate protocols. If DISPLAY TYPE 1225 detects an external device, then it will enact the VISIBLE SELECTOR 1250 which waits for the purchaser to ROLL OVER ITEM 1350 at which time a VISIBLE ITEM DESCRIPTION 1500 appears. The VISIBLE SELECTOR 1250 is preferably a visible marker to track an item on the screen. A common tool by which this is performed is a cursor moved by a mouse, but may also include infrared, object recognition, and pattern recognition utilizing other devices such as remote controls, cell phones, game controllers, laser pointers, optical sensors, motion sensors, and the like. When the purchaser uses a mouse or other device to ROLL OVER ITEM 1350, a visible description may appear on the viewing screen or on the device being used to track the object. The purchaser may or may not be prompted to click on an item and the BC&P SYSTEM 1000 waits for the purchaser to SELECT ITEM 1600. If the purchaser does not SELECT ITEM 1600, then the VIDEO RESUMES 1750, and again the BC&P SYSTEM 1000 resumes the process back at ACCESS CATALOG 1100. If the purchaser does SELECT ITEM 1600 then the BC&P SYSTEM 1000 will get to ITEM BOOKMARKS TO CATALOG SYSTEM 1650. Going back to DISPLAY TYPE 1225, if the DISPLAY TYPE 1225 detects that the a TOUCH SCREEN 1300 is being used, then the BC&P SYSTEM 1000 waits for the purchaser to TOUCH ITEM 1400, at which time a VISIBLE ITEM DESCRIPTION 1500, which is unique in the art, then the ITEM BOOKMARKS TO CATALOG SYSTEM 1650. The ITEM BOOKMARKS TO CATALOG SYSTEM 1650 is also a unique feature of the present invention and is absent in all prior art. The details of the ITEM BOOKMARKS TO CATALOG 1650 are shown in detail in FIG. 2.

Once the ITEM BOOKMARKS TO CATALOG SYSTEM 1650 has been reached two things happen: ENGAGE ITEM DESCRIPTION 1700 and the DATA PROCESSING & TRANSFER 2000 system are triggered.

The ENGAGE ITEM DESCRIPTION 1700 will wait for either a yes or no response. If the response is no, then VIDEO RESUMES 1750 is enabled and goes back the ACCESS CATALOG 1100 to resume the process. If the response is yes, then DETAILED ITEM DESCRIPTION APPEARS, OPTION TO PURCHASE 1800 occurs. The purchaser will be presented with the option to ADD TO CART 1850, to which the purchaser will respond. If the response is no, then VIDEO RESUMES 1750 is enabled and goes back the ACCESS CATALOG 1100 to resume the process. If the response is yes, then the item is added to SHOPPING CART 1900 for the purchaser to finalize the purchase.

Figure 2:
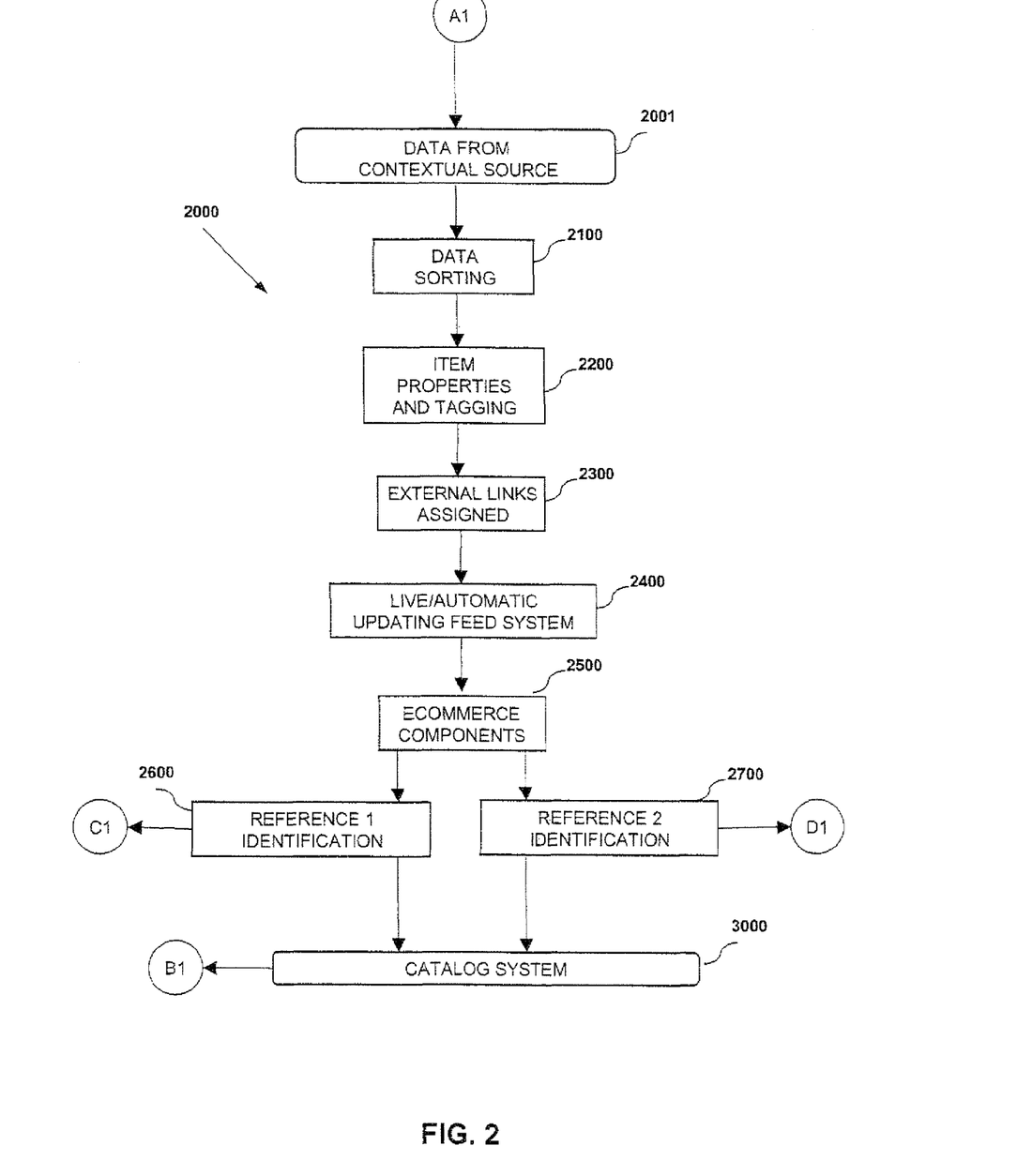
FIG. 2 is a block diagram detail of the Data Processing and Transfer System, as noted by A1 of FIG. 1, of a preferred embodiment of the present invention.

Referring now to FIG. 2, there is shown a detail, A1, of the innovative DATA PROCESSING & TRANSFER 2000 system, which is how ITEM BOOKMARKS TO CATALOG 1650, and which is one of the unique and novel features of the present invention. When an ITEM BOOKMARKS TO CATALOG SYSTEM 1650 is triggered, the DATA PROCESSING & TRANSFER 2000 is activated. Rather than merely book marking a product for later reference, as in the prior art, the present invention adds additional information and characteristics associated with the product. Through this process, the present invention gathers, collects, updates and stores information regarding the product, rather than just the product information alone. For example, the contextual information about the product is included in the DATA FROM CONTEXTUAL SOURCE 2001. Thus, in addition to the product information, contextual information such as the character, characters, person, persons, actor or actors in the video who had been using the product, the scene in which the product was featured, the episode and video genre, and the like, are all included in the information that is book marked with the product. Later, in the CATALOG SYSTEM 2000, a purchaser can view, sort and/or find information about the product by looking for the character or by the scene in which the product was featured. This information is then sorted at DATA SORTING 2100 and the ITEM PROPERTIES AND TAGGING 2200 associates all the product information and the contextual information together and tags them to the product. At EXTERNAL LINKS ASSIGNED 2300, external links, such as several stores that are currently selling the product and their prices, social network comments regarding the product, the product brand's website, news stories about the product, and the like, are gathered and associated with the product. A LIVE/AUTOMATIC UPDATING FEED SYSTEM 2400 is also included so that the purchaser has current information. An ECOMMERCE COMPONENTS 2500 link is further associated with the product so that the purchase may be completed. All this information, both the product information and the contextual, external, and live information are sorted into various reference systems. The present invention currently illustrates the use of two references systems, but it is within the spirit and scope of this invention that more reference systems may be used. The data sorted into REFERENCE 1 IDENTIFICATION 2600, containing the characteristics of the product, and REFERENCE 2 IDENTIFICATION 2700, containing all the external data. The REFERENCE 1 IDENTIFICATION 2600 and REFERENCE 2 IDENTIFICATION 2700 are now accessible by the CATALOG SYSTEM 3000. It can be seen that, through the CATALOG SYSTEM 3000, a purchaser can view, sort and/or find information about the product by looking for the character or by the scene in which the product was featured, or news comments because of the data in REFERENCE 1 IDENTIFICATION 2600 and REFERENCE 2 IDENTIFICATION 2700.

Figure 3:
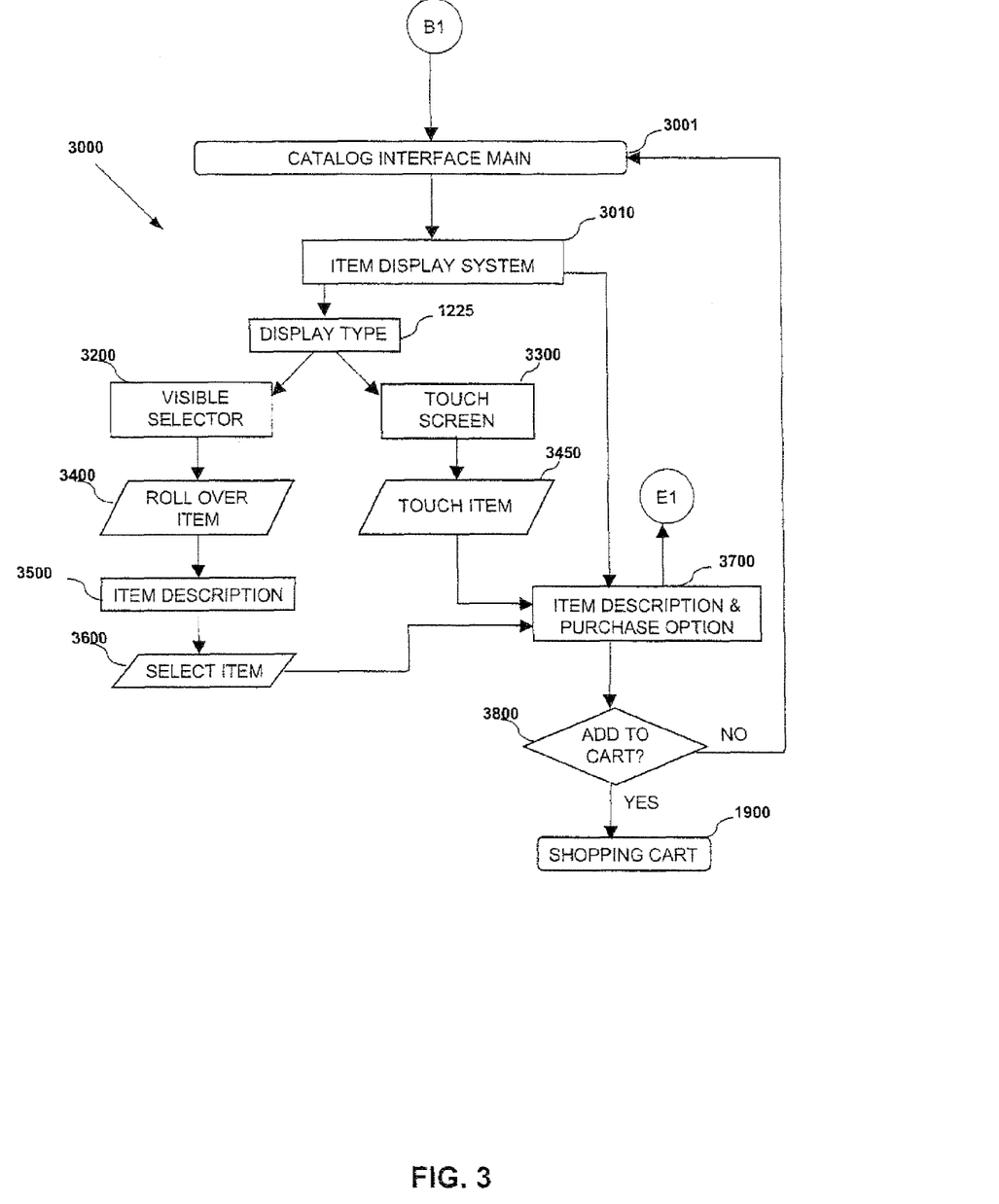
FIG. 3 is a block diagram detail of the Catalog System, as noted by B1 of FIG. 1, of a preferred embodiment of the present invention.
Figure 4:
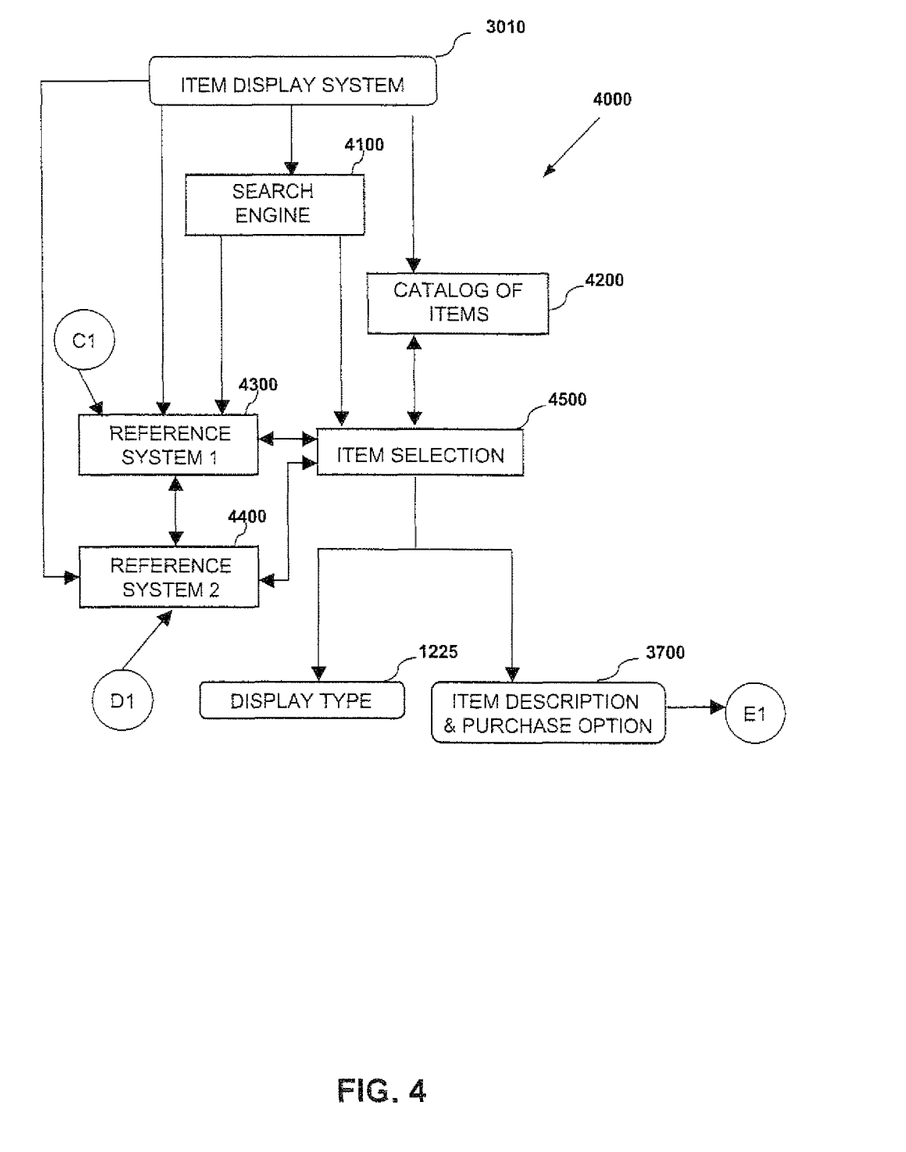
FIG. 4 is a block diagram detail of the Item Recall System, located within the Catalog System, of a preferred embodiment of the present invention.

FIG. 3 is a detail of the CATALOG SYSTEM 3000. When the purchaser accesses the CATALOG SYSTEM 3000, the purchaser will encounter the CATALOG INTERFACE MAIN 3001, through which the purchaser will have communication and interaction. The purchaser will not see the other processes that are occurring, only what is shown on the CATALOG INTERFACE MAIN 3001. The ITEM DISPLAY SYSTEM 3010 becomes activated, and a detail of this is illustrated in FIG. 4. The ITEM DISPLAY SYSTEM 3010 will recall and display the item, the external data or both. Utilizing DISPLAY TYPE 1225, the present invention again verifies the means by which the purchaser is interacting with the present invention. In a manner similar to that already described above, the DISPLAY TYPE 1225 detects an external device, then the CATALOG SYSTEM 3000 will enact the VISIBLE SELECTOR 3200 which waits for the purchaser to ROLL OVER ITEM 3400 at which time ITEM DESCRIPTION 3500 appears and then further waits for the purchaser to SELECT ITEM 3600. If the DISPLAY TYPE 1225 detects that a TOUCH SCREEN 3300 is being used, then the present invention waits for the purchaser to TOUCH ITEM 3450. When the purchaser activates either SELECT ITEM 3600 or TOUCH ITEM 3450, the ITEM DESCRIPTION & PURCHASE OPTION 3700 is enabled. A detail of the ITEM DESCRIPTION & PURCHASE OPTION 3700 process is illustrated in FIG. 5.

The innovative ITEM DISPLAY SYSTEM 3010, which is detailed ITEM DISPLAY SYSTEM DETAIL 4000 in FIG. 4, allows a purchaser to find a book marked product in several different ways. One way to find the book marked item, is by utilizing the SEARCH ENGINE 4100. The purchaser may also look for the book marked product in the CATALOG OF ITEMS 4200. Additionally, the purchaser may use CATALOG OF ITEMS 4200 to display various items that have not been bookmarked, but are available for purchase and/or about which the purchaser may learn more information. The purchaser may also look for the book marked product in any or all of the reference systems, such as REFERENCE SYSTEM 1, 4300, wherein REFERENCE 1 IDENTIFICATION 2600 resides, and REFERENCE SYSTEM 2, 4400, wherein REFERENCE 2 IDENTIFICATION 2700 resides. This allows the purchaser to search for products not only by name and category, but also the secondary aspects of the product which were captured earlier. By way of example, the purchase can search by character in the episode, so that the purchaser can see everything that character was using, and also by the scene, so that the purchaser can see everything that was used in that particular room or location. The present invention may have more reference identifications and more corresponding reference systems as necessary. When an item has been selected, ITEM SELECTION 4500 is enabled and there is interactivity among the above means of finding and viewing products. DISPLAY TYPE 1225 continues to verify the means the viewing purchaser is using, and the product selected in ITEM SELECTION 4500 is then brought to the ITEM DESCRIPTION & PURCHASE OPTION 3700, which is detailed in FIG. 5.

Figure 5:
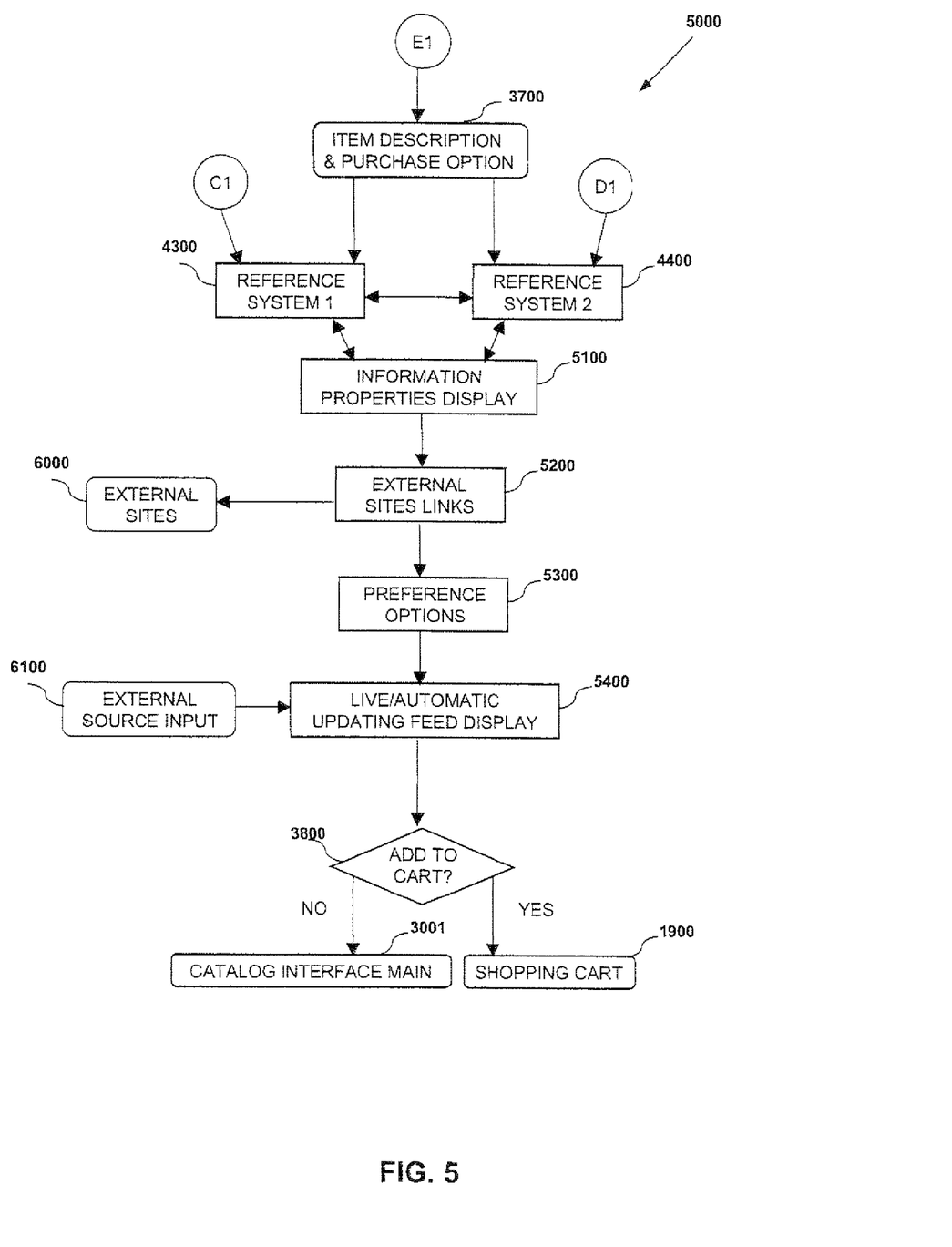
FIG. 5 is a block diagram detail of the Item Description & Purchase Option system, as noted by E1 of FIG. 3, of a preferred embodiment of the present invention.

Referring now to FIG. 5, there is illustrated the detail of the ITEM DESCRIPTION & PURCHASE OPTION 3700 process. ITEM DESCRIPTION & PURCHASE OPTION 3700 calls data from the reference systems, including REFERENCE SYSTEM 1, 4300, and REFERENCE SYSTEM 2, 4400, which further interact with each other so as to gather all stored data associated with the product. This information is then displayed on the INFORMATION PROPERTIES DISPLAY 5100. External sites 6000 are reviewed and any data found that is pertinent to the product is additionally included and linked to the data at EXTERNAL SITES LINKS 5200. PREFERENCE OPTIONS 5300 are further included. External sources are sought and reviewed at EXTERNAL SOURCE INPUT 6100 and included at LIVE/AUTOMATIC UPDATING FEED DISPLAY 5400. The purchaser will be prompted whether the product might be purchased at ADD TO CART 3800. If the response is no then the purchaser is brought back to CATALOG INTERFACE MAIN 3001 to exit or to perform more searches. If the response is yes, then the product is placed in a SHOPPING CART 1900 and the purchaser may do more shopping or may purchase the items in the SHOPPING CART 1900.

Figure 6:
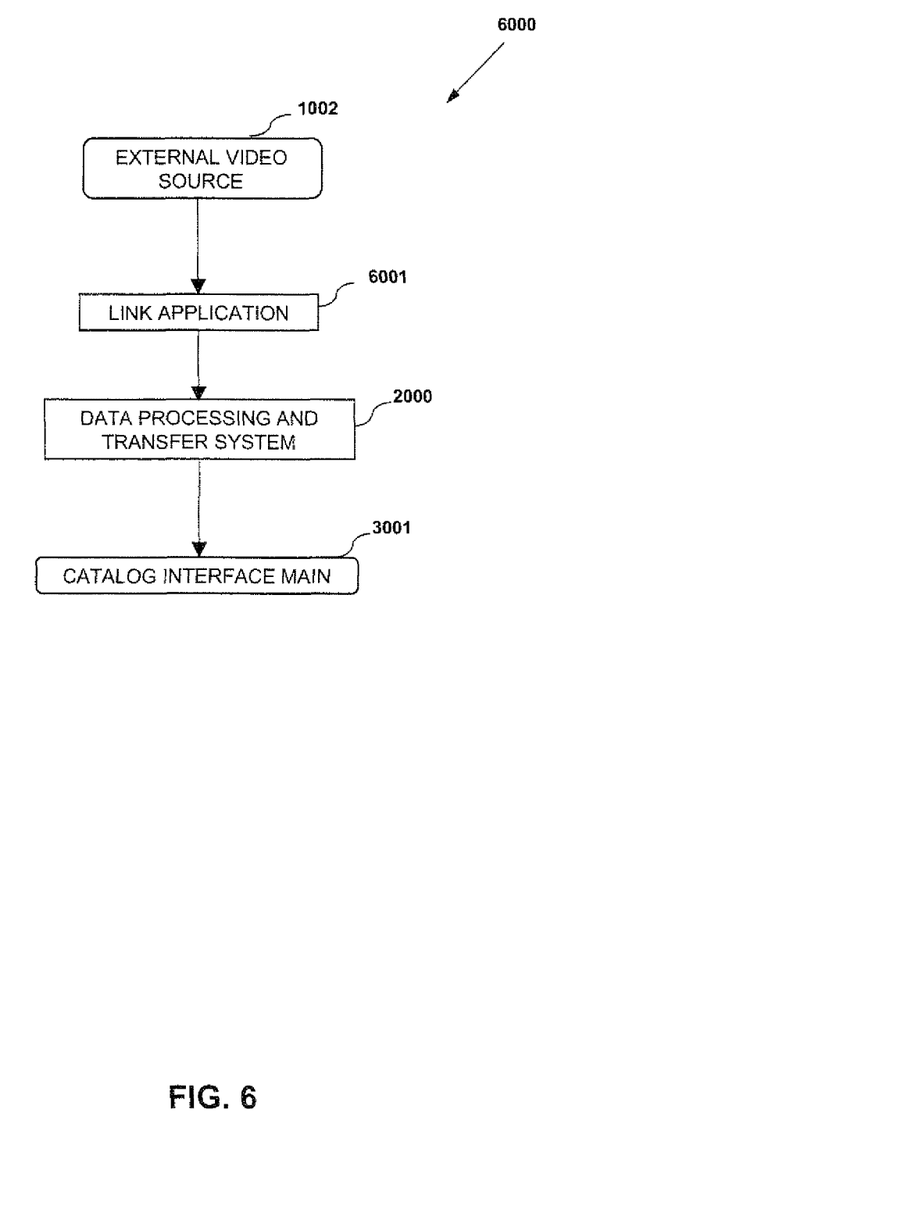
FIG. 6 is a block diagram illustrating the general system of a preferred embodiment of the present invention wherein the video source does not have a transparent layer with which a purchaser may interact, identify and engage with objects that appear on the screen.

Referring now to FIG. 6, there is illustrated the process by which a purchaser may obtain the benefits of the present invention on data from an external video source. There may be situations in which a purchaser is viewing an EXTERNAL VIDEO SOURCE 1002, wherein that which is being viewed has not been treated with a transparent interactive layer. By way of example, EXTERNAL VIDEO SOURCE 1002 includes that which is seen on non-digital formats like television and video cassettes, on formats that are not available or not yet available on a multi-media device, such as film, DVDs and movies, and on formats that have yet to be treated or cannot be treated with a transparent interactive layer, such as DVDs, old movies and live events. There may also be times wherein the purchaser is not presently watching a video, but still wants information about it. The purchaser will have downloaded a LINK APPLICATION 6001. The LINK APPLICATION 6001 may be added to any appropriate device, including cell phones, computers and multi-media devices. At LINK APPLICATION 6001, the purchaser indicates the source from which purchasing and informational data is being requested. LINK APPLICATION 6001 will then access the DATA PROCESSING AND TRANSFER SYSTEM 2000 of the present invention which follows through to the CATALOG INTERFACE MAIN 3001 and so on to completion or sale. Generally, LINK APPLICATION 6001 is on a different device from that which is being viewed. By way of example, the purchaser can be watching a live red carpet event on television and see a desirable dress, or the purchaser can be watching a video cassette of a movie and see an interesting car, or the purchaser may be at the mall and cannot recall the lamp seen on a television show, or the purchaser may be present at a sporting event and want more information about a favorite sportsman's shoes, the purchaser then pulls out his/her smart cell phone, or other portable multi-media device, accesses LINK APPLICATION 6001 and indicates the red carpet event, movie title, television show title, or sporting event, and the LINK APPLICATION 6001 will provide the information to the purchaser, and follow the abovementioned protocols and processes to provide further information and/or complete a sale.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A computer system comprising:
   a processor;
   a display; and
   a memory system, comprising instructions, which, when executed, cause the computer system to perform a multi-objective presentation and sale of goods and services by a bookmarking, cataloging and purchasing method, the method comprising the steps of:
   a. engaging a continuously running online video source;

b. determining the type of display on which the video source is being viewed;
c. enacting user interaction protocols appropriate for the type of display determined;
d. determining that the video source has a transparent layer containing digital data regarding goods and services;
e. accessing the digital data from the continuously running online video source;
f. transferring the digital data from the continuously running online video source to a searchable catalog containing information about goods and services appearing on the continuously running video source, presenting the information about the goods and services in the searchable catalog to enable selection of a good or a service by a consumer;
g. awaiting input from a consumer to display data regarding a good or service while the continuously running online video source runs;
h. displaying data related to a good or service upon input from the consumer;
i. prompting the consumer to either select or not select the good or service;
j. automatically bookmarking the good or service to a catalog system if the consumer selects the good or service;
k. prompting the consumer to display detailed information regarding the good or service and displaying the detailed information upon an affirmative response from the consumer;
l. providing an option to purchase good or service within the detailed information regarding the good or service;
m. placing the good or service in a virtual cart for future purchase, if consumer elects the option to purchase good or service;
n. providing a purchasing capability for the good or service;
o. repeating steps f through n until completion of video;
p. displaying, upon completion of video, information regarding various goods and services within the video source, including all bookmarked goods and services;
q. awaiting a selection by the consumer for more information regarding goods and services seen within the continuously running online video source, for viewing bookmarked goods and services, for viewing and purchasing goods and services in the virtual cart, for accessing information regarding other goods and services in the catalog system, or for other menu functions while the video source is continuously running so as not to disrupt the continuously running online video source; and
r. performing the selection of the consumer.

2. The computer system of claim 1, wherein performing any of the selected functions further comprises the functionality of the consumer selecting to view detailed information regarding a good or service, bookmark or unbookmark a good or service, add or remove good or service to or from cart, to search catalog for goods and services and to exit the menu.

3. The computer system of claim 1, wherein bookmarking the good or service to a catalog system if the consumer selects the good or service further comprises the step of:
engaging an item description, at which the consumer is prompted for a yes or no response and a yes response results in a detailed description of the good or service appearing with an option to purchase and add to shopping cart and proceed to shopping cart.

4. The computer system of claim 1, further comprising the step of engaging a downloaded link application from which the catalog and purchasing steps of the present invention are accessed.

5. A computer system comprising:
a processor;
a display; and
a memory system, comprising instructions, which, when executed, cause the computer system to perform a multi-objective presentation and sale of goods and services by a bookmarking, cataloging and purchasing method, the method comprising the steps of:
a. engaging a continuously running online video source;
b. determining that the video source has a transparent layer containing digital data regarding goods and services;
c. accessing the digital data from the continuously running online video source;
d. transferring the digital data from the continuously running online video source to a searchable catalog containing information about goods and services appearing on the continuously running video source, presenting the information about the goods and services in the searchable catalog to enable selection of a good or a service by a consumer;
e. bookmarking the good or service to a catalog system if the consumer selects the good or service;
f. providing an option to purchase good or service within the detailed information regarding the good or service;
g. placing the good or service in a virtual cart for future purchase, if consumer elects the option to purchase good or service;
h. providing a purchasing capability for the good or service;
i. repeating steps d through h until completion of the continuously running online video;
j. awaiting a selection by the consumer for more information regarding goods and services seen within the continuously running online video source, for viewing bookmarked goods and services, for viewing and purchasing goods and services in the virtual cart, for accessing information regarding other goods and services in the catalog system, or for other menu functions while the video source is continuously running so as not to disrupt the continuously running online video source; and
k. performing the selection of the consumer.

6. The computer system in accordance with claim 5, further comprising:
inserting the following steps after step "a"
a. determining the type of display on which the video source is being viewed; and
b. enacting user interaction protocols appropriate for the type of display determined.

7. The computer system in accordance with claim 6, further comprising:
inserting the following steps after step "d"
a. awaiting input from a consumer to display data regarding a good or service while the video source runs;
b. displaying data related to a good or service upon input from the consumer;
c. prompting the consumer to either select or not select the good or service; and
d. prompting the consumer to display detailed information regarding the good or service and displaying the detailed information upon an affirmative response from the consumer; and
e. providing an option to purchase good or service within the detailed information regarding the good or service.

8. The computer system in accordance with claim 7, further comprising:
   a. displaying, upon completion of video, information regarding various goods and services within the continuously running online video source, including all bookmarked goods and services.

9. The computer system of claim 5, wherein performing any of the selected functions further comprises the functionality of the consumer selecting to view detailed information selected from the group consisting of a good or service, bookmark or unbookmark a good or service, add or remove good or service to or from cart, to search catalog for goods and services and to exit the menu.

10. The computer system of claim 5, wherein bookmarking the good or service to a catalog system if the consumer selects the good or service further comprises the step of:
   a. engaging an item description, at which the consumer is prompted for a yes or no response wherein a no response results in resuming the video and a yes response results in a detailed description of the good or service appearing with an option to purchase and add to shopping cart and an option to resume the video or proceed to shopping cart.

\* \* \* \* \*